United States Patent
Fu et al.

(10) Patent No.: US 10,162,666 B2
(45) Date of Patent: *Dec. 25, 2018

(54) APPARATUS, SYSTEMS AND METHODS FOR CROSS-CLOUD SOFTWARE MIGRATION AND DEPLOYMENT

(71) Applicant: Cisco Technology, Inc., San Jose, CA (US)

(72) Inventors: Tianying Fu, San Jose, CA (US); Venkat Narayan Srinivasan, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/217,812

(22) Filed: Jul. 22, 2016

(65) Prior Publication Data
US 2016/0335114 A1  Nov. 17, 2016

Related U.S. Application Data

(63) Continuation of application No. 14/204,630, filed on Mar. 11, 2014, now Pat. No. 9,430,213.

(51) Int. Cl.
| | |
|---|---|
| *G06F 9/46* | (2006.01) |
| *G06F 9/455* | (2018.01) |
| *G06F 9/48* | (2006.01) |
| *G06F 8/61* | (2018.01) |

(52) U.S. Cl.
CPC ............ *G06F 9/45558* (2013.01); *G06F 8/63* (2013.01); *G06F 9/4856* (2013.01); *G06F 2009/4557* (2013.01); *G06F 2009/45562* (2013.01); *G06F 2009/45595* (2013.01)

(58) Field of Classification Search
CPC ...... G06F 9/45558; G06F 8/63; G06F 9/4856; G06F 2009/4557; G06F 2009/45595
See application file for complete search history.

(56) References Cited

U.S. PATENT DOCUMENTS

| | | | |
|---|---|---|---|
| 6,718,535 B1 | 4/2004 | Underwood | |
| 7,028,218 B2 | 4/2006 | Schwarm et al. | |
| 7,523,190 B1 | 4/2009 | Bickerstaff et al. | |
| 7,809,975 B2 | 10/2010 | French et al. | |
| 7,849,350 B2 | 12/2010 | French et al. | |
| 7,853,767 B2 | 12/2010 | Maki et al. | |
| 8,090,979 B2 | 1/2012 | Watanabe et al. | |
| 8,176,208 B2 | 5/2012 | Shishido et al. | |
| 8,250,215 B2 | 8/2012 | Stienhans et al. | |
| 8,353,012 B2 * | 1/2013 | Del Real | G06F 21/6218 705/326 |

(Continued)

OTHER PUBLICATIONS

"Third-Party Submission under 37 CFR 1.290 Concise Description of Relevance," filed in U.S. Appl. No. 14/497,196 on Feb. 18, 2015.

*Primary Examiner* — Camquy Truong
(74) *Attorney, Agent, or Firm* — Fernando & Partners, LLP; Ying Li

(57) ABSTRACT

Embodiments disclosed facilitate obtaining a cloud agnostic representation of a first Virtual Machine Image (VMI) on a first cloud; and obtaining a second VMI for a second cloud different from the first cloud, wherein the second VMI is obtained based, at least in part, on the cloud agnostic representation of the first VMI.

20 Claims, 7 Drawing Sheets

(56) References Cited

U.S. PATENT DOCUMENTS

| | | |
|---|---|---|
| 8,386,839 B2 | 2/2013 | Watanabe et al. |
| 8,489,918 B2 | 7/2013 | Watanabe et al. |
| 8,495,635 B2 * | 7/2013 | Shen .................. G06F 11/1438 718/101 |
| 8,805,951 B1 * | 8/2014 | Faibish ................. G06F 9/5072 709/213 |
| 8,904,005 B2 | 12/2014 | Ferris et al. |
| 2002/0013895 A1 | 1/2002 | Kelley et al. |
| 2002/0120741 A1 | 8/2002 | Webb et al. |
| 2004/0098458 A1 | 5/2004 | Husain et al. |
| 2007/0083650 A1 | 4/2007 | Collomb et al. |
| 2007/0260702 A1 | 11/2007 | Richardson et al. |
| 2009/0216975 A1 | 8/2009 | Halperin et al. |
| 2009/0300151 A1 | 12/2009 | Friedman et al. |
| 2010/0042720 A1 | 2/2010 | Stienhans et al. |
| 2010/0061250 A1 | 3/2010 | Nugent |
| 2010/0070319 A1 | 3/2010 | Prafullchandra et al. |
| 2010/0088150 A1 | 4/2010 | Mazhar et al. |
| 2010/0125476 A1 | 5/2010 | Yeom et al. |
| 2010/0125844 A1 | 5/2010 | Mousseau et al. |
| 2010/0191796 A1 | 7/2010 | Almeida et al. |
| 2010/0228819 A1 | 9/2010 | Wei |
| 2010/0235830 A1 | 9/2010 | Shukla et al. |
| 2011/0185292 A1 | 7/2011 | Chawla et al. |
| 2011/0320821 A1 | 12/2011 | Alkhatib et al. |
| 2012/0131591 A1 | 5/2012 | Moorthi et al. |
| 2012/0158803 A1 | 6/2012 | Kandasamy et al. |
| 2012/0159459 A1 | 6/2012 | Turner et al. |
| 2012/0167088 A1 | 6/2012 | Sok |
| 2012/0179820 A1 | 7/2012 | Ringdahl et al. |
| 2012/0203823 A1 | 8/2012 | Manglik et al. |
| 2012/0233625 A1 | 9/2012 | Sabin et al. |
| 2012/0239739 A1 | 9/2012 | Manglik et al. |
| 2012/0254966 A1 | 10/2012 | Parker |
| 2012/0266170 A1 * | 10/2012 | Zimmerman ............. G06F 8/63 718/1 |
| 2012/0331528 A1 | 12/2012 | Fu et al. |
| 2013/0151598 A1 | 6/2013 | Fu et al. |
| 2013/0185715 A1 | 7/2013 | Dunning et al. |
| 2013/0227089 A1 * | 8/2013 | McLeod ............. G06F 9/45558 709/220 |
| 2013/0262801 A1 | 10/2013 | Sancheti et al. |
| 2014/0040656 A1 | 2/2014 | Ho et al. |
| 2015/0039770 A1 | 2/2015 | Manglik et al. |
| 2015/0089499 A1 * | 3/2015 | Hsuan ................. G06F 9/45558 718/1 |
| 2015/0121078 A1 | 4/2015 | Fu et al. |

* cited by examiner

APPARATUS, SYSTEMS AND METHODS FOR CROSS-CLOUD SOFTWARE MIGRATION AND DEPLOYMENT

CROSS REFERENCE TO RELATED APPLICATIONS

This application is a continuation of U.S. patent application Ser. No. 14/204,630 entitled "Apparatus, Systems And Methods for Cross-Cloud Application Deployment," filed Mar. 11, 2014. The above-identified application is incorporated by reference in its entirety herein.

BACKGROUND

Field of the Invention

The present invention relates to the field of distributed computing and in particular, to apparatus, systems, and methods to facilitate cross-cloud migration and deployment of cloud-based software including virtual machine images.

Description of Related Art

The performance of computing applications may often be increased by distributing the computational workload across nodes in a networked cluster of computers. A physical networked cluster of computers with attendant software facilitating virtualization is often referred to as a "cloud" or "cloud infrastructure" or simply an infrastructure. The software layer permits the underlying physical hardware associated with clouds, which can include servers, memory, storage, and network resources, to be viewed as virtualized units. These virtualized units represent some fraction of the underlying computing hardware or resources supported by the cloud infrastructure. Therefore, from a logical perspective, clouds may be viewed as a collection of virtual machines ("VMs"). Typically, a cloud may provide a variety of VM types with different computing (CPU), memory, storage, networking, and Operating System (OS) options.

Clouds, thus, may be viewed as services that provide access to infrastructure remotely, including compute, storage and network resources, so that the resources can be reserved, provisioned, accessed and released programmatically. For example, programmatic interfaces such as Application Programming Interfaces (APIs), System Development Kits (SDKs), Web Services, etc. may be used to access resources made available by clouds remotely over a wide-area network (WAN). For example, in publicly available clouds or "public clouds", these resources can be accessed programmatically over the Internet and are made available as VMs on a pay-per-use basis. On the other hand, organizations may have private clouds for use by employees or customers within an enterprise's data center.

VMs are typically software implementations of a computer. VMs often provide a complete system platform, which may also support the execution of a complete operating system by the VM in addition to one or more applications. VMs may be instantiated on clouds using images, which are typically filesystem images, which include an operating system, application servers and/or application(s) to be executed by the VM, data, and a cloud specific portion. The cloud specific portion of the image may include, for example, cloud specific configuration settings for configuration of storage resources, compute resources, security, access rights, etc for the cloud on which the VM is being instantiated.

In addition, each cloud provider may use proprietary image formats for virtual machine images. Further, each cloud may have differing cloud-specific bootstrapping and management mechanisms as part of the image. These bootstrapping mechanisms may specify initialization and other actions to be taken at boot time when the VM is instantiated.

For users who deploy or desire to deploy one or more applications on multiple clouds, the process of migrating images between clouds and/or creating images tailored to each cloud on which an application is being deployed can be time consuming, resource intensive, and error prone. In addition, users may often lack information about how the image was initially setup and/or any image related application configuration, thereby making it difficult to recreate a functionally equivalent image on a different cloud. Therefore, cost, time and expense may be significant impediments to multi-cloud deployment of applications and/or migrating applications between clouds, thereby effectively creating "cloud lock-in"—where the user is locked to a specific cloud provider.

Thus, there is a need for systems, methods, and apparatus that facilitate the deployment and migration of application between clouds while maintaining functional equivalence.

SUMMARY

Consistent with embodiments disclosed herein, apparatus, systems and methods for facilitating the deployment and migration of application between clouds.

In some embodiments, a processor-implemented method may comprise: obtaining a cloud agnostic image representation, the cloud agnostic image representation being obtained from a first Virtual Machine Image (VMI) on a first cloud, the cloud agnostic image representation being obtained, in part, by removing a cloud specific layer in the first VMI; and obtaining a second VMI for a second cloud different from the first cloud, wherein the second VMI is obtained based, at least in part, on the cloud agnostic image representation.

Embodiments disclosed also pertain to an apparatus comprising: at least one processor coupled to at least one cloud, wherein the at least one processor is configured to: obtain a cloud agnostic image representation, the cloud agnostic image representation being obtained from a first Virtual Machine Image (VMI) on a first cloud, the cloud agnostic image representation being obtained, in part, by removing a cloud specific layer in the first VMI; and obtain a second VMI for a second cloud, wherein the second VMI is obtained based, at least in part, on the cloud agnostic image representation.

Additional embodiments pertain to a computer-readable medium comprising instructions, which when executed by a processor, perform steps in a method comprising: obtaining a cloud agnostic image representation, the cloud agnostic image representation being obtained from a first Virtual Machine Image (VMI) on a first cloud, the cloud agnostic image representation being obtained, in part, by removing a cloud specific layer in the first VMI; and obtaining a second VMI for a second cloud different from the first cloud, wherein the second VMI is obtained based, at least in part, on the cloud agnostic image representation.

In addition, in some embodiments, apparatus may comprise: at least one processing means coupled to at least one cloud means, wherein the at least one processing means comprises: means for obtaining a cloud agnostic image representation, the cloud agnostic image representation being obtained from a first Virtual Machine Image (VMI) on a first cloud means, the cloud agnostic image representation being obtained, in part, by removing a cloud specific layer in the first VMI; and means for obtaining a second VMI for a second cloud means, wherein the second VMI is obtained based, at least in part, on the cloud agnostic image representation.

Embodiments also relate to software, firmware, and program instructions created, stored, accessed, or modified by processors using computer-readable media or computer-readable memory. The methods described may be performed on processors, various types of computers, and computing systems—including distributed computing systems such as clouds. The methods disclosed may also be embodied on computer-readable media, including removable media and non-transitory computer readable media, such as, but not limited to optical, solid state, and/or magnetic media or variations thereof and may be read and executed by processors, computers and/or other devices.

These and other embodiments are further explained below with respect to the following figures.

DETAILED DESCRIPTION

In accordance with embodiments disclosed herein, apparatus, systems and methods to facilitate secure communications for cloud-based applications are presented.

Figure 1:
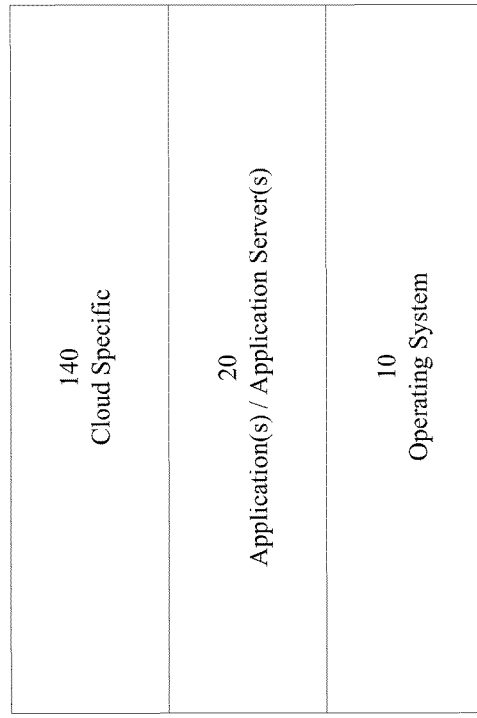
FIG. 1 illustrates an exemplary cloud virtual machine image (VMI) for a VM being deployed on a cloud.

FIG. 1 illustrates an exemplary cloud virtual machine image (VMI) 100 for a VM being deployed on a cloud. As shown in FIG. 1, VMI 100 may comprise an Operating System ("OS") layer 10, Application layer 20, which may comprise one or more applications and/or application servers, and cloud specific layer 140. OS layer 10 in VMI 100 may include the operating system and other services used by Application Layer 20. Application Layer 20 may include an application that has been pre-installed and configured and/or other application servers.

Further, VMI 100 may include cloud specific layer 140, which may specify configuration settings, bootstrapping and other initialization routines that are specific to the cloud on which the software/VMI is being deployed. Thus, cloud specific layer 140 may be viewed as encapsulating activities that are used for cloud-specific purposes including cloud settings, initialization, bootstrapping, image packaging, drivers, hypervisor and/or virtual machine monitor related, etc., For example, the VMI may comprise a VM and the bootstrapping mechanisms may specify initialization and other actions to be taken at boot time when the VM is instantiated. As an example, the Amazon Web Service Elastic Cloud Computing (EC2) Amazon Machine Image (AMI) relies on a special cloud-init daemon to handle initial VM host name change, user secure shell (SSH) key pass-in, and other VM initialization during boot up time. In contrast, a VMware based private cloud will rely on the VMware Tools service to pass-in key-value pair guest information from the cloud management system.

In addition, each cloud provider may use proprietary image formats for virtual machine image packaging. For example, Amazon Web Service Elastic Cloud Computing (AWS EC2) uses the Amazon Machine Image (AMI) format, but a VMware based private cloud may use VMware's Virtual Machine Disk (VMDK) format.

Figure 2:
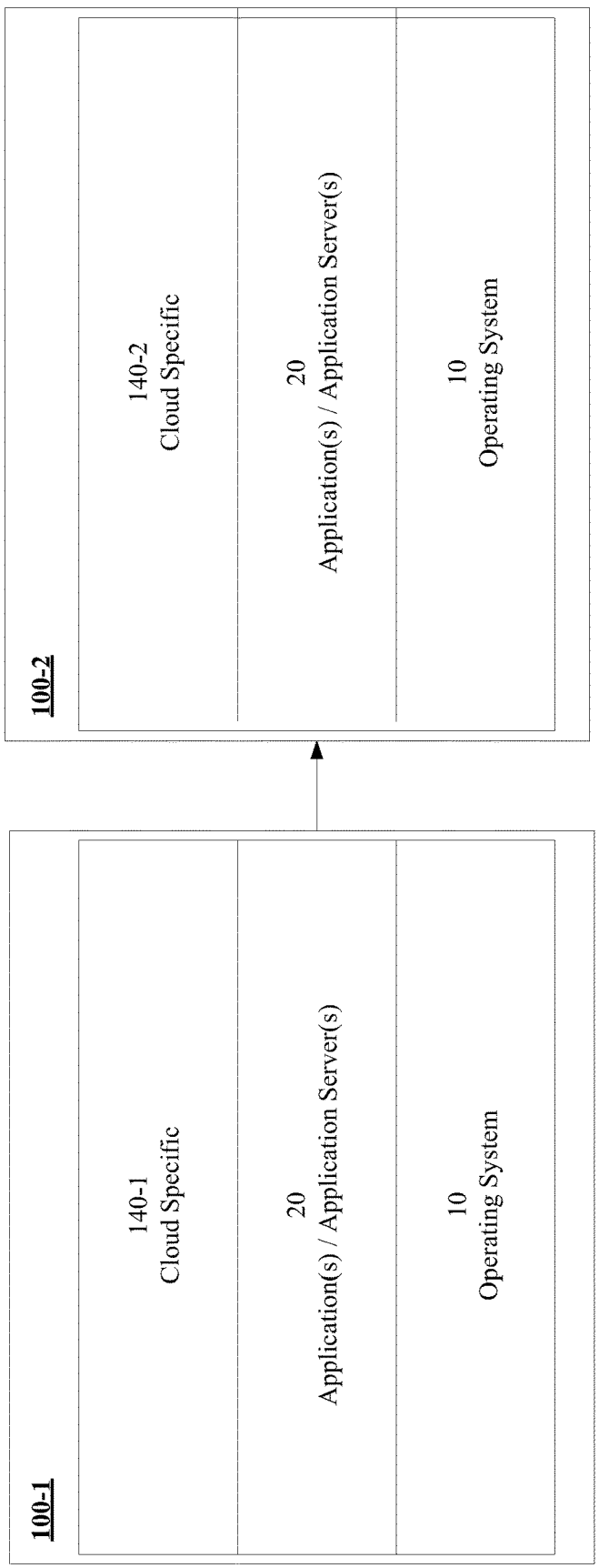
FIG. 2 shows a high level process flow illustrating the conversion of VMI 100-1 for a first cloud to VMI for a second cloud.

FIG. 2 shows a high level process flow 200 illustrating the conversion of VMI 100-1 for a first cloud to VMI 100-2 for a second cloud. As shown in FIG. 2, a Cloud 1, VMI 100-1 may comprise OS layer 10, Application Layer 20 and cloud specific layer 140-1 for Cloud 1. A functionally equivalent VMI Cloud 2, VMI 100-2 may comprise OS layer 10, Application Layer 20 and cloud specific layer 140-2 for Cloud 2.

Conventional Physical to Virtual (P2V) techniques for image conversion typically use an existing disk volume as-is to build a cloud image. Thus, if the image was intended for Cloud 1, then the cloud image built from the disk volume may not work or will not boot up correctly on Cloud 2 because cloud specific layer 140-1 may be incompatible with Cloud 2. Further, to the extent that cloud providers provide tools, these tools typically allow only the conversion of physical machines into virtual machines that are supported by the specific cloud vendor. In addition, because virtual machine image formats are often proprietary, the tools provided may only support popular formats and may not work with an arbitrary virtual machine image format.

Because applications are constantly evolving, users desiring to run an application on multiple clouds are faced with the resource intensive and time consuming task of maintaining multiple changing cloud images with cloud specific layers for each cloud on which the application is to be run. Again, to the extent that there are Virtual to Virtual (V2V) tools to convert a source cloud image to a target cloud image, these V2V tools typically work only with a specific source cloud image (i.e. for a select cloud provider) and further may only permit the source cloud image to be converted to a single target cloud image. Thus, while V2V tools may be supplied by a cloud provider to "migrate in" from a competitor, cloud providers do not provide V2V tools to "migrate out". At any rate, it is impractical for an application provider or user to run a plethora of different tools provided by different entities for P2V or V2V conversion of cloud images, while also guaranteeing application integrity and functionality across multiple clouds.

In general, in a multi-cloud environment, a V2V transformation of an image from source to target cloud based on conventional techniques would use a source-target cloud specific transform implementation. Accordingly, if there are total of n clouds, achieving arbitrary cross-cloud transformation based on conventional schemes would n*(n−1) transformation implementations. In addition, for each new added cloud, e.g. for n+1 clouds, there will be an additional 2n transformation implementations (n transformations from the other n clouds to the newly added cloud and n transformations from the newly added cloud to the other n clouds). Thus, in a system of n clouds, each additional cloud supported will result in a net extra 2n transform implementations. Even if V2V support is provided only between a few clouds, with the clouds themselves continually evolving and being updated with new functionality, maintaining and updating transform implementations may be impractical and infeasible.

Therefore, embodiments disclosed facilitate cross cloud VM image deployment and migration. Embodiments disclosed also facilitate VMI migration and deployment from an arbitrary first cloud to an arbitrary second cloud, which may be different from the first cloud.

Figure 3:
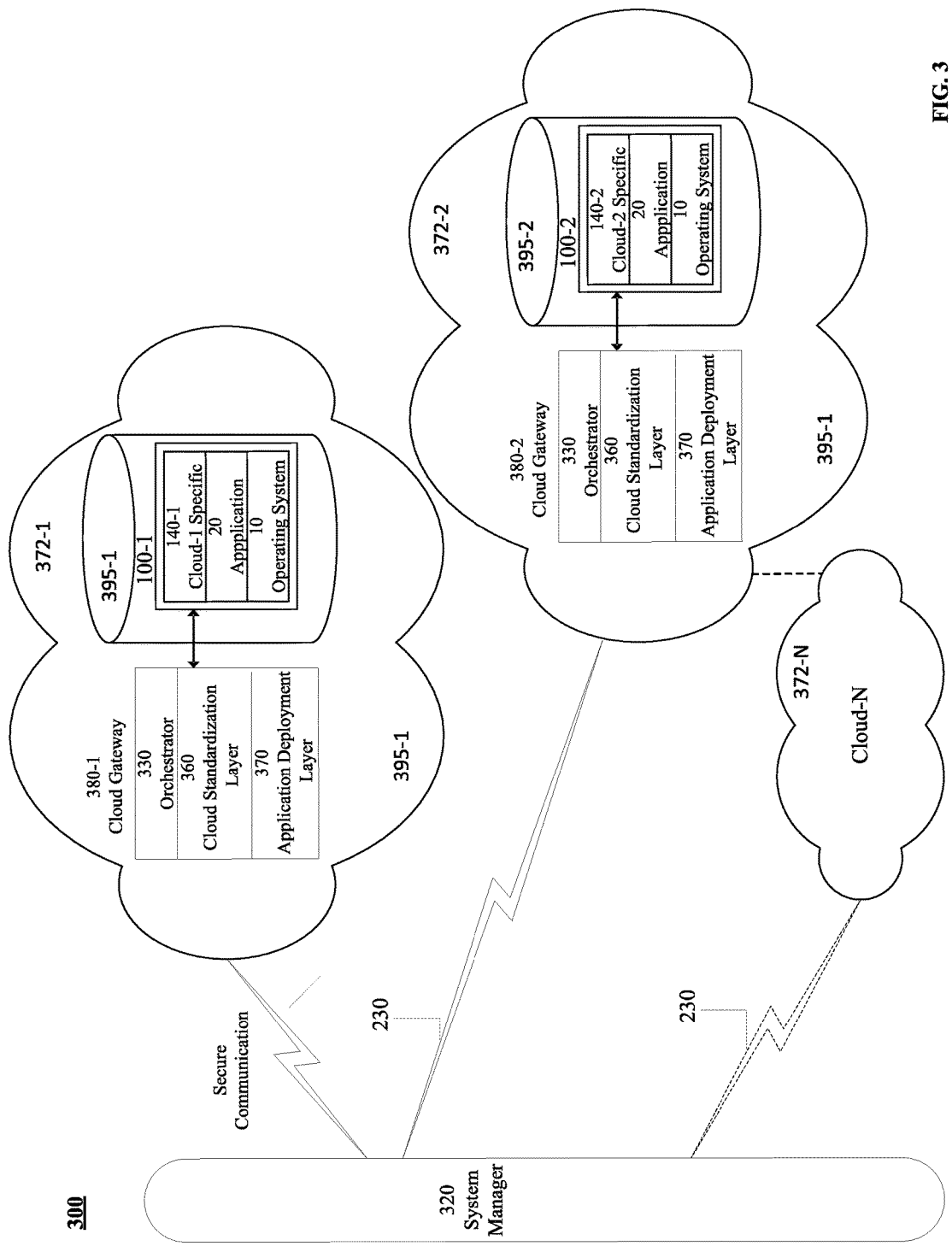
FIG. 3 shows an exemplary system for facilitating cross cloud VMI deployment and migration in a manner consistent with disclosed embodiments.

FIG. 3 shows an exemplary system 300 for facilitating cross cloud VMI deployment and migration in a manner consistent with disclosed embodiments. System 300 shown in FIG. 3 is used merely exemplary and is used to illustrate the operation of some disclosed embodiments. Techniques and embodiments disclosed may also be deployed and/or used in conjunction with various other cloud-based architectures and/or distributed computing systems. As shown in FIG. 3, system 300 may include System Manager 320, Orchestrator 330, Cloud Standardization Layer 360, Application Deployment Layer 370, and Cloud Gateway 380.

System 300 may also include one or more clouds, which are shown as Clouds 372-1, 372-2 ... 372-N and collectively referred to as Clouds 372. Clouds 372 may communicate with at least one System Manager 320 using communication links 230. Communication links 230 may permit secure communication between System Manager 320 and one or more of Orchestrator 330, Cloud Standardization Layer 360, Application Deployment Layer 370, and/or Cloud Gateway 380. System Manager 320 may be in communication with one or more clouds 372-i at any time.

System 300 may also comprise VMI 100-1, which may be specific to Cloud 372-1. System 300 may facilitate cross cloud software and/or VMI transformation and migration in a manner consistent with disclosed embodiments. For example, VMI 100-2, which is specific to Cloud 372-2, may be obtained from VMI 100-1 and migrated or deployed to Cloud 372-2 in a manner consistent with disclosed embodiments.

In some embodiments, System Manager 320 may manage application topology information and coordinate various VMIs with Orchestrator 330. For example, System Manager 120 may receive, maintain, and update user information, cloud information, application related information (e.g. application profile) and other data such as job history, policies, etc. In some embodiments, System Manager 320 may provide information about the application being deployed. In some embodiments, System Manager 320 may also facilitate user views of application files and data on shared storage, may move the application files and data to cloud storage, and provide functionality to synchronize the application files and data between clouds.

In some embodiments, System Manager 320 may serve as a storehouse and manager of information pertaining to user activities. For example, System Manager 320 may act as a management layer to initiate and manage application deployment and monitoring activities.

In addition System Manager 320 may also manage automated tasks, which, in some embodiments, may have been initiated by Orchestrator 330. System Manager 320 may also call or invoke functions implemented by Orchestrator 330 in order to perform various system related activities. In some embodiments, System Manager 320 may maintain a relational database or data repository with information pertaining to system users including user authentication and authorization information; a list of clouds (372-1, ... 372-N) and available cloud configurations for each cloud 372-i; information pertaining to applications/entities; policies that a user may have specified, etc.

In some embodiments, Orchestrator 330 may use a common application representation to deploy and run a given application on any cloud, irrespective of implementation differences pertaining to the provisioning and utilization of application resources on the individual clouds, in part, by using functionality provided by Cloud Standardization Layer 360.

In some embodiments, Cloud Standardization Layer 360 may include functionality to facilitate standardization of library constructs (such as shared storage, network, cluster, security, etc.) across a variety of cloud providers. Although cloud providers may have provider-specific Application Programming Interfaces (APIs) and other infrastructure differences, Cloud Standardization Layer 360 may provide applications a cloud agnostic or a cloud infrastructure-independent view of resources, including compute, storage and network resources. For example, Cloud Standardization Layer 360 can be a repository for various functional modules that permit applications to utilize various resources (including shared storage, server types, clusters and features such as queues, security, etc.) on each cloud in a cloud-agnostic manner.

In some embodiments, Cloud Standardization Layer 360 may maintain resource standardizations for various clouds, such as exemplary clouds 372-1, 372-2 ... 372-N, as well as references to cloud-specific implementations of the standardizations for clouds 372. In some embodiments, exemplary Cloud Standardization Layer 360 may also maintain service-level agreements (SLAs), capability information about each cloud resource, information pertaining to cloud availability, reliability, and security, and performance and pricing information. Information may be maintained by Cloud Standardization Layer 360 by using metadata XML files or databases, which, in some implementations, may be persistent. In some implementations, the capability information can be stored as {key, value} pairs in a database. Because individual clouds may have different capabilities for a standardized resource type, capability information may be indexed by cloud.

In some embodiments, the common application representation may take the form of application descriptors (not shown) such as pattern and system primitives, which may be input to Orchestrator 330. The pattern and system primitives may describe the execution patterns as well as node, storage, communication and network characteristics pattern and system primitives. Exemplary application descriptors can include information such as: application software and hardware requirements, application profile (whether memory intensive, Input-Output intensive, CPU intensive, etc.), specification of a distributed computing paradigm, application steps (for workflow style applications). Exemplary embodiments of these primitives, Orchestrator 330, and cloud coordinator/gateway 380 have also been described in co-pending U.S. patent application Ser. No. 13/024,302 filed Feb. 9, 2011, entitled "Apparatus, Systems and Methods for Deployment and Management of Distributed Computing Systems and Applications," which has been incorporated by reference in its entirety into the present application.

In some embodiments, Orchestrator 330 may facilitate the deployment, running, and monitoring of applications on various clouds. For example, Orchestrator 330 may dynamically launch VM 100-*i* on a selected cloud 372-*i* for application execution in response to an execute command entered by a user.

Orchestrator 330 may also maintain routines and other program code that implement algorithms for deploying, optimizing, managing and monitoring application runs on clouds. In some embodiments, routines and other functions performed by Orchestrator 330 may be managed and initiated by the System Manager 320. Orchestrator 330 may also report back the status and results of the various orchestration activities to System Manager 320. In one embodiment, Orchestrator 330 may directly query System Manager 320 for information such as application data, policies, and cloud information.

Tasks performed by Orchestrator 330 on Clouds 372 may be facilitated by Cloud Standardization Layer 360. For example, functionality provided by Cloud Standardization Layer 360 may permit Orchestrator 330 to use infrastructure independent representations of application code to deploy applications. In some embodiments, the infrastructure independent or cloud independent or cloud agnostic program code may be common across all clouds 372 because the Cloud Standardization Layer 360 may uses Application Deployment Layer 370, which may comprise cloud specific Plugins, APIs and Cloud Specific Libraries, to perform tasks for Orchestrator 330 on any given cloud 372-*i*. In some implementations, the deployment and running of applications and the dynamic management of clusters and other cloud resources may be facilitated by Cloud Application Deployment Layer 370.

In some embodiments, the dynamic management of VMs, clusters and other cloud resources may be facilitated by using a node management service running on a "cloud coordinator/gateway" or "cloud gateway" or gateway 380 for a specific cloud 372-*i*. Gateway 380 may also maintain Cloud APIs and Cloud specific Libraries.

Cloud Specific Libraries and Cloud APIs may comprise a library of implementations for primitives and composite interfaces, respectively, for a specific cloud 372-*i*. In some embodiments, Cloud APIs and Cloud Specific Libraries may be invoked using Cloud Plugins. For example, Cloud Plugins may be used to invoke appropriate Cloud APIs and routines from Cloud Specific Libraries that permit the deployment and running of applications on Clouds 372, where the applications may have been described using application descriptors and standardized primitives from Cloud Standardization Layer 360.

In some embodiments, when an application is to be deployed, a gateway 380-*i* may use Cloud APIs and Cloud Specific Libraries to perform deployment and execution tasks for cloud 372-*i*. For example, shared storage primitives on Cloud Standardization Layer 360 may lead to instantiation of a DFS shared storage implementation on an Amazon™ cloud, while instantiating the shared storage implementation on a Terremark™ cloud will set up NAS/SAN.

In some embodiments, gateway 380-*i* may also launch one or more agents (not shown), which can be deployed on Cloud 372-*i*. In some embodiments, functionality specified or configured by the user may be implemented by gateway 380, Orchestrator 330, and/or Cloud Application Deployment Layer 370, which, in some implementations, may include software agents running on the various clouds 372. These software agents may monitor application runtime statistics, collect cloud related information such as but not limited to cloud load information, pricing information, security information etc., and/or collect information related to VMs and/or user actions.

For example, the agents may be configured to monitor VMs, for example by selectively capturing and/or removing one or more cloud specific function calls, cloud specific initialization, cloud specific bootstrapping etc. In some embodiments, the agents may be configured to selectively capture and/or selectively remove one or more cloud specific actions prior to VMI launch. For the purposes of the description, a VM launched from a VMI 100-*i* is referred to as VM 110-*i*. For example, an agent running on cloud 372-1 and/or in VM 110-1 may capture a subset of actions taken by Cloud Specific layer 140-1 in VM 110-1, while removing others. In one embodiment, the agents may capture and/or remove cloud specific function calls, cloud specific initialization, cloud specific bootstrapping and/or all commands prior to the launch of application(s) in Application Layer 20. In some embodiments, the agents may capture all information following the launch of VM 110-1 on cloud 372-1.

In some embodiments, the agents may report the actions performed as well as other task status back to gateway 380-*i*, Orchestrator 330 and/or System Manager 320. For example, in one embodiment, the agent(s) may collect and/or remove cloud specific VM information (such as cloud initialization, bootstrapping, other cloud-specific configuration actions) selectively when VM 110-1 is launched on a first cloud 372-1 and may report the collected information pertaining to Cloud Specific layer 140-1 to one or more of gateway 380-*i*, Cloud Standardization Layer 360, Orchestrator 330 and/or System Manager 320. In some embodiments, the agents may provide the collected information to one or more modules in Cloud Standardization Layer, which may obtain a cloud agnostic representation of the collected information.

As shown in FIGS. 1B and 3, in some embodiments, to convert a VMI 100-1 for an application that runs on cloud provider 372-1 to VMI 100-2 that runs on cloud provider 372-2, the OS layer 10 and Application layer 20 may be maintained but cloud specific layer 140-1 may be removed prior to conversion of VMI 100-1 to a portable image, which may then be run on cloud provider 372-2. In some embodiments, the portable image may take the form of a cloud agnostic representation. For example, if VM 110-1 is being run on an Amazon cloud, Amazon specific settings and configurations may be removed. For example, Amazon settings such as the "cloud-init" daemon, which is used to handle initial VM host name change, user secure shell key pass-in, and other VM initialization during boot up time, may be removed. Next, orchestrator 330, which may be associated with gateway 380 and/or Cloud Abstraction Layer 360 on cloud 372-2, may retrieve the image data derived from VMI 100-1 from the cloud agnostic representation, insert the cloud specific settings for cloud 372-2, and create VMI 100-2 on cloud 372-2. For example, if VM 110-2 is being run on a VMware cloud, then, the VMware Tools service, which is used to perform corresponding functions in a VMware private cloud, may be inserted to obtain VMI 100-2.

In some embodiments, a cloud-specific implementation VMI 100-*i* for a cloud i may be used to obtain a cloud agnostic representation by Cloud Standardization Layer 360 by removing cloud specific settings. Next, a cloud specific implementation VMI 100-*j* may be obtained from the cloud agnostic representation by adding cloud specific settings for cloud j to obtain VMI 100-*j* for a cloud j by Application Deployment Layer 370. For example, the infrastructure independent representation of cloud specific layer 140-1 may be used, at least in part, to obtain VMI 100-*j* for one of various target clouds j such as on one or more of Amazon EC2, Terremark vCloud, Rackspace Cloudserver, Microsoft Azure, Savvis, or private clusters, which may be different from the first cloud 372-1.

In some embodiments, to facilitate creating of VMI 100-2, after launching VM 110-1, volume data 395-1 for VM 110-1 on cloud 372-1 may be copied and output in a lossless compressed raw format and/or another data format compatible with data representation in Cloud Standardization Layer 360. In some embodiments, a cloud agnostic representation of volume data 395-1 for VM 110-1 may be maintained in Cloud Standardization Layer 360.

Further, in some embodiments, based in part, on the functionally equivalent cloud agnostic representation of cloud specific layer 140-1, a new VM (not shown in FIG. 3) may be launched on cloud 372-2. In some embodiments, the new VM may be launched based on any operating system compatible with the OS in OS layer 10. For example, based on the operating system type in VMI 100-1, the new VM may take the form of a "helper VM" with a compatible OS. Accordingly, the new and/or helper VM may be launched on second cloud 372-2. For example, if VM 100-1 is based on CentOS 6.2, but the second cloud 372-2 supports a base image of CentOS 6.3, a helper VM may be launched with OS layer 10 based on a CentOS 6.3. Further, the cloud agnostic and/or lossless compressed raw representation of volume data 395-1 for VM 100-1 as stored in Cloud Standardization Layer 360 may be downloaded to cloud 372-2 for the newly launched VM on cloud 372-2.

In some embodiments, based on the volume data size information, a new persistent volume may be created and attached to the new VM. For example, commands specific to cloud 372-2 may be used to create and attach the volume to the new VM. In some embodiments, these commands may be provided by Cloud Abstraction Layer 360 and implemented by Application Deployment Layer 370 in second cloud 372-2. Next, the downloaded volume data may be unbundled to the attached volume as volume data 395-2. In some embodiments, the unbundling process may use Application Deployment Layer 370 on cloud 372-2 to convert a cloud agnostic representation of the data in Cloud Standardization Layer 360 to a format compatible with or supported by cloud 372-2.

Further, during the launch of the new VM, the cloud specific layer 140-2 may be obtained with initialization and configuration settings specific to cloud 372-2. In some embodiments, Application Deployment Layer 370 on cloud 372-2 may be used to obtain and add cloud specific settings for cloud 372-2 to the newly launched VM. For example, if cloud 372-2 is a VMware implementation, then, VMware specific settings and configuration such as a VMware Tools daemon may be added.

In some embodiments, volume 395-2 may then be detached. In some embodiments, the routines to detach volume in cloud 375-2 may be derived from instructions in Cloud Standardization Layer 360 and implemented using Application Deployment Layer on cloud 372-2.

Next, a bootable virtual machine image VMI 100-2 may be obtained from detached volume 395-2. For example, instructions/commands to obtain VMI 100-2 may be obtained from Cloud Standardization Layer 360 and implemented using Application Deployment Layer on cloud 372-2.

Thus, system 300 may facilitate cross cloud VMI deployment and migration in a manner consistent with embodiments disclosed herein. System 300 is merely exemplary and various additional functional modules (not shown in FIG. 3) and/or a different architecture may be used to facilitate cross cloud VM image deployment and migration in a manner consistent with embodiments disclosed herein.

Figure 4:
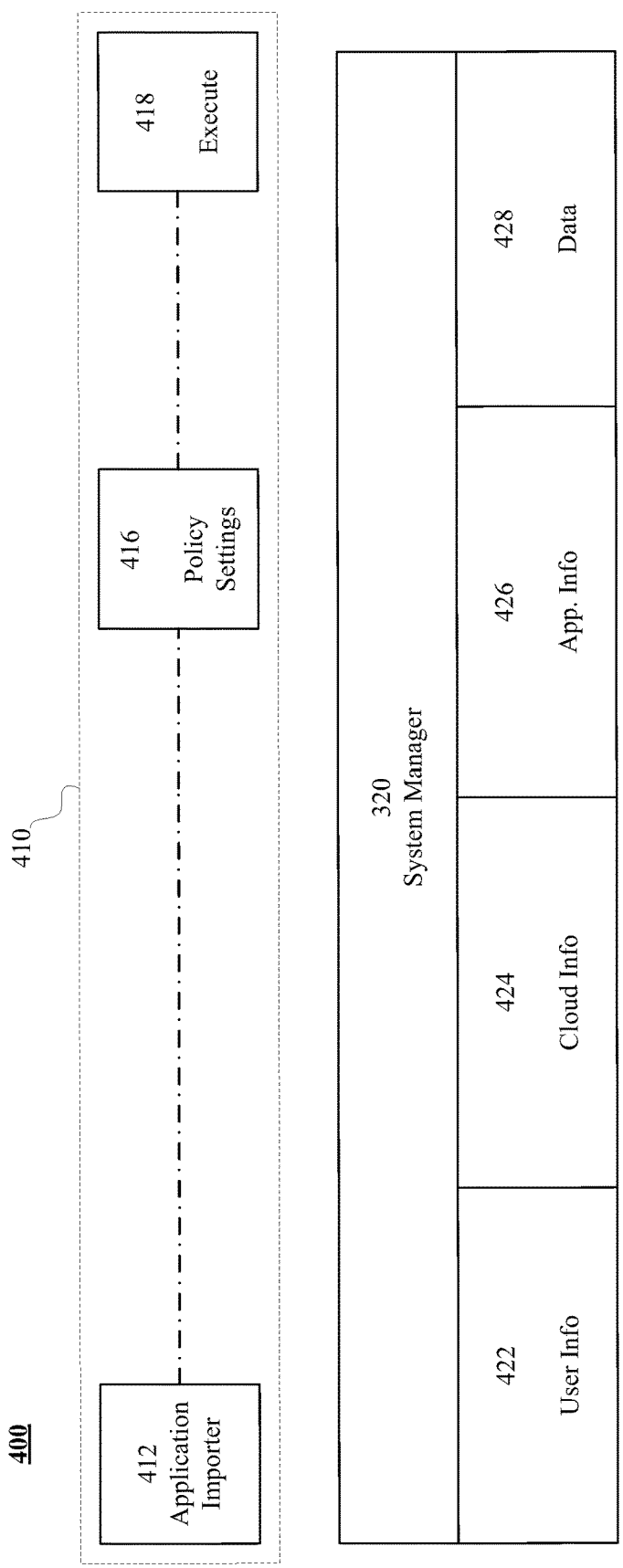
FIG. 4 shows the architecture of exemplary system manager along with other modules and/or layers that interact with System Manager.

FIG. 4 shows the architecture 400 of exemplary system manager 320 along with other modules and/or layers that interact with System Manager 320. In some embodiments, System Manager 320 may interact with exemplary User Interface Layer 410, which, in turn, may facilitate user configuration of system 300. Exemplary User Interface Layer 410 may comprise Application Importer Module 412, Policy Setting Module 416, and Execute Module 418. For example, Application Importer Module 412 may be used to import an application profile and other application specific information.

Exemplary User Interface Layer 410 may also include various end-user modules that permit user customization and configuration of system 300. Exemplary Application Importer Module 412 may facilitate the importation of new applications and/or the migration of applications and/or images in system 300. In some embodiments, imported applications may be displayed to users using a "desktop-style" view, where icons representing the various applications are shown to the user in a window or browser tab. In some embodiments, pre-published applications in a marketplace associated with system 300 (for example, applications in an application library or "app store" associated with or supported by system 300 may be imported by users directly onto their desktop view. In some embodiments, Application Importer Module 412 may allow users to license or buy one or more of pre-published applications. In general, any software application may be imported using exemplary Application Importer Module 412 in User Interface Layer 410

In some embodiments, Policy Settings Module 416 may provide appropriate graphical user interfaces and other features to permit users to set, modify, and/or delete policies, which may be implemented using a policy engine. For example, users may set policies that limit the clouds and/or configurations that specific user(s) and/or application(s) may use/migrate to, limit the monetary budget available for an application run or a series of runs, etc.

In some embodiments, Execute Module 418 may provide user interfaces to permit users to select an application and/or a first/source VMI 100-*i*, a cloud 372-*i* (from available clouds 372-1, 372-2 . . . 372-N), specify a second cloud 372-*j* for the second/target VMI 100-*j*. In some embodiments, VMI 100-2 may then be obtained from VMI 100-1 on first cloud 372-*i* in a manner consistent with disclosed embodiments. In some embodiments, the VMI 100-2 may be launched on the selected second cloud 372-*j*.

In addition, as indicated by the dashed lines, User Interface Layer 410 may include several other modules (not shown) to allow users to specify system functionality related to reporting, auditing, billing, and permit viewing of application files and data on shared storage. For example, Reporting may provide analytical reports and runtime statistics over and/or other information. The reports may be diced and sliced based on user, application and/or other criteria. Auditing may use agent monitoring to track user actions and report them. Billing may track the price of each job for invoicing to the customer. Modules in User Interface Layer 410 may also allow users to set permissions and other attributes on application and storage files in order to facilitate sharing and collaboration with other users.

Exemplary System Manager 320 may manage user information 422 and coordinate various user tasks with Orchestrator 330. For example, System Manager 320 may receive, maintain, and update user information 422, cloud information 424, application information 426 and other data 428 such as job history, housekeeping information etc. In some embodiments, System Manager 320 may also facilitate user views of application files and data on shared storage, may move the application files and data to cloud storage, and synchronize the application files and data between clouds.

In some embodiments, based on user input, such as actions in Execute module 418, System Manager 320 may communicate with Orchestrator 330 to begin the process of migration, deployment and/or execution of the selected VM 100-*i* on a target cloud 100-*j*. Orchestrator 330 may then use techniques described herein, including cloud agnostic representations, based, in part, on functionality provided by Cloud Standardization Layer 360 to obtain, deploy, and run VM 100-*j* on cloud 372-*j*.

In some embodiments, System Manager 320 may serve as a storehouse and manager of information pertaining to user activities. For example, System Manager 320 may act as a management layer to initiate and manage application deployment and monitoring activities. In one embodiment, System Manager 320 may interact with modules in User Interface Layer 410 in order to facilitate the performance of management tasks on applications that may have been initiated by the user through User Interface Layer 410. Management tasks facilitated by System Manager 320 may include, for example, initiating application deployment, facilitating secure communications, configuring user and cloud accounts, specifying policies for application runs, and specifying base metrics around desired application price and performance.

In addition System Manager 320 may also manage automated tasks, which, in some embodiments, may have been initiated by Orchestrator 330. System Manager 320 may also call or invoke functions implemented by Orchestrator 330 in order to perform various system related activities. For example, System Manager 320 may invoke a secure communications module to facilitate secure communication with a new VM. In some embodiments, System Manager 320 may maintain a relational database or data repository with information pertaining to system users including user authentication and authorization information; a list of clouds (372-1, . . . 372-N) and available cloud configurations for each cloud 372-*i*; policies that a user may have specified, etc.

In some embodiments, Orchestrator 330 may use a common application or cloud agnostic representation to deploy and run specified software and/or applications on any cloud, irrespective of implementation differences pertaining to the provisioning and utilization of application resources on the individual clouds, in part, by using functionality provided by Cloud Standardization Layer 360.

In some embodiments, the common application or cloud agnostic representation may take the form of application descriptors (not shown), which may be input to Orchestrator 330. In some embodiments, a user may specify applications to import using Application Importer module 412 and application descriptors, which may include various primitives such as pattern and system primitives, may be used to describe applications to Cloud Standardization Layer 360.

In some embodiments, Orchestrator 330 may facilitate the deployment, running, and monitoring of applications on various clouds. For example, Orchestrator 330 may dynamically invoke functionality to build VMI 100-2 on selected cloud 372-2 from VMI 100-1 on cloud 372-1 in response to an execute command entered by a user using an interface presented by Execute module 418. In some embodiments, an automatic trigger may be set by the user to migrate or deploy a VM across clouds when some condition, which may be cloud-specific, is met. In some embodiments, a user interface may permit selection of a first cloud, a first VMI and the second cloud, where the first and second clouds are selected from a plurality of available clouds and the methods consistent with disclosed embodiments may be used obtain a VMI for the second cloud.

Orchestrator 330 may maintain routines and other program code that implement algorithms for deploying, optimizing, managing and monitoring application and VM runs on clouds. In some embodiments, routines and other functions performed by Orchestrator 330 may be managed and initiated by the System Manager 320. Orchestrator 330 may also report back the status and results of the various orchestration activities to System Manager 320. In one embodiment, Orchestrator 330 may directly query System Manager for information such as application data, policies, and cloud information.

Tasks performed by Orchestrator 330 on Clouds 372 may be facilitated by Cloud Standardization Layer 360. For example, functionality provided by Cloud Standardization Layer 360 permits Orchestrator 330 to use infrastructure independent or cloud agnostic representations of application code to deploy applications. In some embodiments, the infrastructure independent or cloud independent or cloud agnostic program code may be common across all clouds 372 because the Cloud Standardization Layer 360 may use functionality provided by Application Deployment Layer 370 to perform tasks for Orchestrator 330 on any given cloud 372-*i*. For example, Cloud Standardization Layer 360 may use functionality provided cloud specific Plugins, APIs and Cloud Specific Libraries to perform tasks for Orchestrator 330 on any given cloud 372-*i*.

Figure 5:
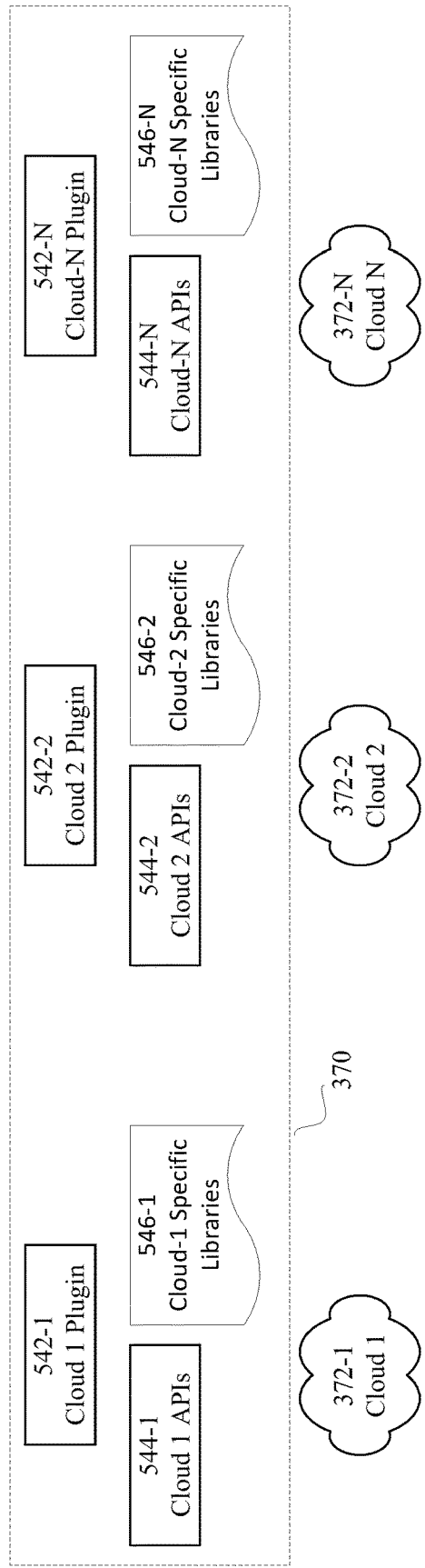
FIG. 5 shows an exemplary architecture of Application Deployment Layer.

FIG. 5 shows an exemplary architecture 500 of Application Deployment Layer 370. In some implementations, the deployment and running of applications and the dynamic management of clusters and other cloud resources may be facilitated by cloud Application Deployment Layer 370. Cloud Application Deployment Layer 370 may include Cloud Plugins 542, Cloud APIs 544 and Cloud Specific Libraries 546.

In some embodiments, the dynamic management of cloud resources may be facilitated by using a service such as a node management service running on gateway 380-*i* for a specific cloud 372-*i*. Gateway 380-*i* may also maintain Cloud APIs 544, such as Cloud-1 APIs 544-1, Cloud-2 APIs 544-2 . . . Cloud N APIs 544-N. In addition, gateway 380-*i* may also maintain Cloud specific Libraries 546, such as Cloud 1 Specific Libraries 546-1, Cloud 2 Specific Libraries 546-2, Cloud N Specific Libraries 546-N, etc. The node management service may act as an intermediate layer between the cloud provider 372-*i* and the cloud orchestrator 380-*i* and facilitate the addition or removal of nodes.

Cloud Specific Libraries 546 and Cloud APIs 544 may comprise a library of implementations for primitives and composite interfaces, respectively, for a specific cloud 372-*i*. In some embodiments, Cloud APIs 544 and Cloud Specific Libraries 546 may be invoked using Cloud Plugins 542. For example, Cloud Plugins 542 may be used to invoke appropriate Cloud APIs 544 and routines from Cloud Specific Libraries 546 that permit the deployment and running of applications on Clouds 372, where the applications may have been described using application descriptors and standardized primitives from Cloud Standardization Layer 360.

In some embodiments, when a VM is to be deployed on a cloud 372, gateway 380 may use Cloud APIs 544 and Cloud Specific Libraries 546 library to perform deployment and execution tasks for that cloud 372. For example, shared storage primitives on Cloud Standardization Layer 360 may lead to instantiation of a DFS shared storage implementation on an Amazon™ cloud, while instantiating the shared storage implementation on a Terremark™ cloud will set up NAS/SAN. In some embodiments, gateway 380 may also launch one or more agents, which can be deployed on nodes on Clouds 372, to monitor and report task status back to gateway 380 and/or to perform other functions.

In some embodiments, functionality specified or configured by the user in User Interface Layer 110 may be implemented by one or more modules in Cloud Application Deployment Layer 170, which, in some implementations, may include software agents running on a server and/or on the various clouds. These software agents may perform specific actions, monitor application runtime statistics, collect cloud related information such as but not limited to cloud load information, pricing information, security information etc., and/or collect information related to VM and/or user actions.

In some embodiments, the software agents may run on each VM and may monitor cloud specific actions including initialization routines, bootstrapping and other configuration performed by the VM. As another example, the software agents may collect data for each application or VM run, which may include but is not limited to: the time of the run, cloud name, cloud configuration for the run, the pricing of that configuration, machine type, OS type, cluster size, storage size, memory size, network backbone type, storage implementation, data pertaining to success/failure/abnormal termination and cause, latency (length of an application run), throughput (number of transactions or requests), cost, etc.

For example, an agent on each node of a cluster may monitor application/VM runs. The data gathered and reported by the agent at a cluster node may be aggregated and used at the gateway level to monitor to track performance and costs across applications/VMs for a user and/or client. In some embodiments, System Manager 120 may aggregate data across users and/or applications by cloud and store the data in a form that may be used for analytics and recommendation purposes.

Figure 6:
FIG. 6 shows a flowchart of an exemplary method for facilitating cross-cloud application and/or VMI deployment and/or migration in a manner consistent with disclosed embodiments.

FIG. 6 shows a flowchart of an exemplary method 600 for facilitating cross-cloud software/VMI deployment and/or migration in a manner consistent with disclosed embodiments. In some embodiments, method 600 may be used to obtain VMI 100-*j* for target cloud j based, at least in part, on VMI 100-*i* for source cloud 372-*i*, where the source cloud 372-*i* and target cloud 372-*j* may be different. For example, in one embodiment, VMI 100-*i*, source cloud 372-*i*, and target cloud 372-*j* may be selected arbitrarily from available clouds 372 and method 600 may be used to obtain VMI 100-*j* for target cloud 372-*j*. In some embodiments, VMI 100-*i* may comprise OS layer 10, Application layer 20, and cloud specific layer 140-*i*.

In step 605, VM 110-*i* may be launched on source/first cloud 372-*i* using VMI 100-*i*. For example, a user may select the first cloud, the first VMI and the second cloud from a plurality of available clouds and one or more modules in system 300 may be used to launch selected VMI 110-*i* on selected cloud 372-*i*.

Next, in step 610, cloud specific settings for first cloud 372-*i* may be removed. For example, an agent and/or one or more modules associated with gateway 380 and/or Application Deployment Layer 370 may remove cloud specific layer 140-1. For example, if VM 110-*i* is being run on an Amazon cloud, Amazon specific settings and configurations may be removed and/or reported. For example, in one embodiment, Amazon settings such as a "cloud-init" daemon may be removed.

In step 615, in some embodiments, volume data, after removal of cloud-specific layer 140-*i* associated with the first VM 110-*i*, may be copied and output as a cloud agnostic representation of volume data in a lossless compressed raw format and/or a another data format compatible with data representation in Cloud Standardization Layer 360. For example, exemplary volume data 395-*i*, after removal of cloud-specific layer 140-*i* associated with the first VM 110-*i*, on cloud 372-*i* may be copied and output as a cloud agnostic representation of volume data. In some embodiments, the data may be output in a lossless compressed raw format and/or another data format compatible with data representation in Cloud Standardization Layer 360. For example, exemplary volume data 395-1, after removal of cloud-specific layer 140-1 associated with the first VM 110-1 on cloud 372-1, may be copied and output in an appropriate format. In some embodiments, a cloud agnostic representation of volume data 395-1, after removal of cloud-specific layer 140-1, may be stored and maintained using functionality provided by Cloud Standardization Layer 360.

Thus, in some embodiments, in steps 605 through 615 a cloud agnostic image representation may be obtained from a first VMI 100-*i* on a first cloud 372-*i*, in part, by removing a cloud specific layer in the first VMI. The cloud agnostic representation of the first VMI may be stored and maintained using functionality provided by Cloud Standardization Layer 360.

In step 620, in some embodiments, based, in part, on the cloud agnostic representation obtained from VM 110-*i* in Cloud Standardization Layer 360, a new/second VM may be launched on cloud 372-*j*. In some embodiments, the new VM may be launched based on any operating system compatible with the OS in OS layer 10. For example, based on the operating system type in VMI 100-1, the new VM may take the form of a "helper VM" with a compatible OS. Accordingly, for example, if the new and/or helper VM is launched on second cloud 372-2 and VMI 100-*i* is based on CentOS 6.2, but cloud 372-2 supports a base image of CentOS 6.3, a helper VM may be launched with a corresponding OS layer 10' based on a CentOS 6.3.

Further, in step 625, the cloud agnostic and/or lossless compressed raw representation of volume data associated with VMI 110-*i*/VMI 100-*i*, as represented in Cloud Standardization Layer 360, may be downloaded to cloud 372-*j* for the newly launched VM on cloud 372-2. For example, the cloud agnostic representation of volume data (e.g. volume data 395-1 after removal of cloud-specific layer 140-1) as represented in Cloud Standardization Layer 360 may be downloaded to cloud 372-2.

Next, in step 630, in some embodiments, based on the volume data size information, a new persistent volume may be created and attached to the new VM. For example, commands specific to cloud 372-*j* may be used to create and attach the volume to the new VM. In some embodiments, these commands may be provided by Cloud Abstraction Layer 360 and implemented by Application Deployment Layer 370 in cloud 372-*j*. For example, commands specific to cloud 372-2 may be used to create and attach the volume to the new VM based on cloud agnostic commands provided by Cloud Abstraction Layer 360 and implemented by Application Deployment Layer 370 in cloud 372-2.

Next, in step 635, the downloaded volume data may be unbundled or restored to the attached volume as volume data 395-*j*. In some embodiments, the unbundling process may use Application Deployment Layer 370 on cloud 372-*j* to convert a cloud agnostic representation of the data in Cloud Standardization Layer 360 to a format compatible with or supported by cloud 372-*j*. For example, the downloaded volume data may be unbundled to the attached volume as volume data 395-2 by converting the cloud agnostic representation of the volume data in Cloud Standardization Layer 360 to a format compatible with or supported by cloud 372-*j*.

Further, in step 640, in some embodiments, volume data 395-*j* may be augmented with the addition of VM initialization and configuration settings specific to cloud 372-*j*. In some embodiments, Application Deployment Layer 370 on cloud 372-*j* may be used to obtain and add cloud specific settings for cloud 372-*j* to the newly launched VM. For example, if the newly launched VM is on a cloud 372-2, which is a VMware implementation, then, VMware specific settings and configuration such as a VMware Tools daemon may be added.

In step 645, in some embodiments, volume 395-*j* may then be detached. In some embodiments, the routines to detach volume in cloud 375-*j* may be derived from instructions in Cloud Standardization Layer 360 and implemented using Application Deployment Layer on cloud 372-*j*. For example, if the new VM was launched on cloud 395-2, then, volume 395-2 may be detached.

Next, a bootable virtual machine image 100-*j* may be obtained from detached volume 395-*j*. which has been augmented with the addition of VM initialization and configuration settings specific to cloud 372-*j*. For example, instructions/commands to obtain VMI 100-*j* may be obtained from Cloud Standardization Layer 360 and implemented using Application Deployment Layer on cloud 372-*j*. For example, VMI 100-2 may be obtained from detached volume 395-*j*.

In some embodiments, steps 620 through 650 may be used to obtain a second VMI (e.g. 100-*j*) for a second cloud (372-*j*) different from the first cloud (372-*i*, i≠j), and the second VMI may be obtained based, at least in part, on the stored cloud agnostic image representation obtained in steps 605 through 615.

In some embodiments, method 600 may be used, for example, to transform a cloud-specific VMI 100-*i* for a first cloud 372-*i* to VMI 100-*j* for a second cloud 372-*j* based, in part, on an infrastructure independent or cloud agnostic representation of cloud specific layer 140-*i*. In some embodiments, the infrastructure independent representation of cloud specific layer 140-*i* may be maintained by Cloud Standardization Layer 360. For example, a first VMI 100-*i* for first cloud 372-*i* may be transformed, to obtain and run a second VMI 100-*j*, on various target clouds such as on one or more of Amazon EC2, Terremark vCloud, Rackspace Cloudserver, Microsoft Azure, Savvis, and/or various other clouds including private clouds, which may be different from the first cloud 372-*i*. Thus, for example, a cloud-specific implementation VMI 100-2, which is functionally equivalent to VMI 100-1, and which corresponds to cloud-configuration 372-2 may be obtained using method 600 in a manner consistent with disclosed embodiments. VMI 100-2 may then be launched or deployed on cloud 372-2.

Note that method 600 is exemplary and for descriptive purposes only and functionality disclosed in one or more steps may be disclosed may be rearranged (re-ordered, combined and/or deleted) in a manner consistent with disclosed embodiments, as would be apparent to one of ordinary skill in the art.

Figure 7:
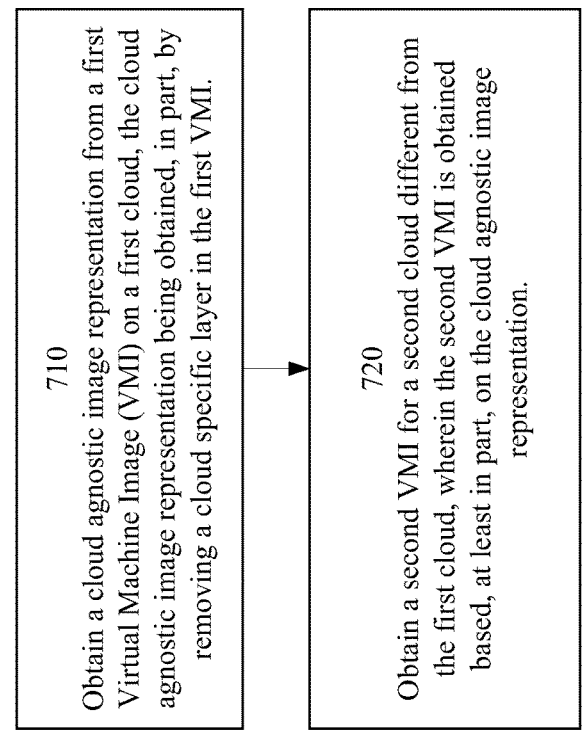
FIG. 7 shows a flowchart of an exemplary method for facilitating cross-cloud application and/or VMI deployment and/or migration in a manner consistent with disclosed embodiments.

FIG. 7 shows a flowchart of an exemplary method 700 for facilitating cross-cloud application and/or VMI deployment and/or migration in a manner consistent with disclosed embodiments. In some embodiments, method 700 may be invoked using a user interface that permits selection of a first cloud, a first VMI associated with the first cloud and a second cloud, where the first and second clouds are selected from a plurality of available clouds.

In some embodiments, in step 710, a cloud agnostic image representation may be obtained. In some embodiments, the cloud agnostic image representation may be obtained from a first Virtual Machine Image (VMI) on a first cloud, wherein the cloud agnostic image representation may be obtained, in part, by removing a cloud specific layer in the first VMI.

In some embodiments, the cloud agnostic image representation may be obtained by launching a first virtual machine (VM) on the first cloud based, in part, on the first VMI; modifying volume data associated with the first VM by removing cloud specific settings for the first VM; obtaining bundled volume data by bundling the modified volume data; and storing a cloud agnostic representation of the bundled volume data.

Next, in some embodiments, in step 720, a second VMI for a second cloud different from the first cloud may be obtained. The second VMI may be obtained based, at least in part, on the cloud agnostic image representation obtained in step 710.

In some embodiments, the second VMI may be obtained, in part, by obtaining a cloud specific layer corresponding to the second cloud, where the cloud specific layer corresponding to the second cloud may be obtained by augmenting the cloud agnostic image representation with cloud specific settings for the second cloud. In some embodiments, the cloud specific layer corresponding to the second cloud may be obtained by: launching, on the second cloud, a second virtual machine obtained from the cloud agnostic image representation. Further, a stored cloud agnostic representation of volume data may be downloaded to the second cloud in a format compatible with the second cloud. The cloud agnostic representation of the volume data may be associated with cloud agnostic image representation obtained from the first VMI. Further, a volume comprising the downloaded volume data to the second cloud may be: (i) created and attached to the second VM; (ii) augmented with cloud specific configuration settings for the second cloud; and (iii) detached. In some embodiments, the second VMI may be created based on the volume comprising the augmented volume data.

In some embodiments, the second VMI may be obtained by: (i) launching a second virtual machine (VM) on the second cloud based, in part, on the cloud agnostic image representation; (ii) obtaining, in a format compatible with the second cloud, volume data for the second VM from the stored cloud agnostic representation of volume data associated with the cloud agnostic image representation; (iii) augmenting the obtained volume data with cloud-specific settings for the second cloud; and (iv) creating the second VMI based on the augmented volume data. In some embodiments, the stored cloud agnostic representation of volume data may be obtained by removing cloud specific settings for the first VM from volume data associated with the first VM. In some embodiments, the second VM may be launched using an operating system that is compatible with but different from an operating system associated with the first VMI.

The VMI 100-*j* may then be launched or deployed on cloud 372-*j*. For example, VMI 100-2 may be launched or deployed on cloud 372-2.

Note that although the description above uses exemplary cloud infrastructures to describe possible implementations, alternate implementations are envisaged and the methods described could be extended to other cloud infrastructures as would be apparent to one of ordinary skill in the art. Further, although primitives, composite interfaces, and templates have been described as exemplary intermediate infrastructure independent representations, other infrastructure independent intermediate representational schemes may also be used. In some embodiments, software to facilitate conducting the processes described above can be recorded on computer-readable media or computer-readable memory. These include, but are not limited to, hard drives, solid state drives, optical media, non-volatile storage of various kinds, removable media, and the like.

In some embodiments, the methods and modules described herein may be implemented using a variety of wired and/or wirelessly networked processors, various computers, and computing devices, including mobile devices such as smartphones, notebooks, and handheld computers, and various distributed computing systems.

Other embodiments will be apparent to those skilled in the art from consideration of the specification and practice of one or more embodiments of the disclosed herein. It is intended that the specification and examples be considered as exemplary only, with a true scope and spirit of the invention being indicated by the following claims.

What is claimed is:

1. A processor-implemented method comprising:
   obtaining a cloud agnostic image representation of an application from a first Virtual Machine Image (VMI) associated with a first Virtual Machine (VM) on a first cloud, wherein the cloud agnostic image representation being obtained, in part, by modifying volume data associated with the first VM to remove a first cloud-specific layer in the first VMI in order to obtain modified volume data and bundling the modified volume data for storage, the first cloud-specific layer being associated with the first cloud, and the first cloud-specific layer permits operation of the first VMI on the first cloud; and
   obtaining a second VMI for a second cloud different from the first cloud, wherein the second VMI is obtained based, at least in part, on the cloud agnostic image representation by unbundling the modified volume data to generate unbundled modified volume data and augmenting the unbundled modified volume data with cloud-specific settings for the second cloud, and the second VMI includes a second cloud-specific layer corresponding to the second cloud.

2. The method of claim 1, wherein:
   obtaining the second VMI comprises obtaining the second cloud-specific layer comprising the cloud-specific settings for the second cloud; and
   augmenting the unbundled modified volume data comprises augmenting the cloud agnostic image representation with the cloud-specific settings for the second cloud.

3. The method of claim 1, further comprising:
   storing the cloud agnostic image representation bundled in the modified volume data.

4. The method of claim 3, wherein modifying the volume data associated with the first VM comprises:
   launching the first VM on the first cloud based, in part, on the first VMI;
   determining cloud-specific settings for the first VM comprised in the first cloud-specific layer; and
   modifying the volume data associated with the first VM by removing the cloud-specific settings for the first VM.

5. The method of claim 1, wherein obtaining the second VMI comprises:
   launching a second VM on the second cloud based, in part, on the cloud agnostic image representation of the application; and
   obtaining, in a format compatible with the second cloud, volume data for the second VM from the cloud agnostic image representation from a volume associated with the second VM.

6. The method of claim 5, wherein the second VM runs a second operating system that is compatible with but different from a first operating system associated with the first VM.

7. The method of claim 1, wherein the first cloud and the second cloud are selected from a plurality of available clouds, the first cloud is associated with a first cloud provider, and the second cloud is associated with a second cloud provider distinct from the first cloud provider.

8. The method of claim 1, further comprising:
   deploying the second VMI on the second cloud.

9. An apparatus comprising:
   at least one processor coupled to at least one cloud, wherein the at least one processor is configured to:
   obtain a cloud agnostic image representation of an application from a first Virtual Machine Image (VMI) associated with a first Virtual Machine (VM) on a first cloud, wherein the cloud agnostic image representation being obtained, in part, by modifying volume data associated with the first VM to remove a first cloud-specific layer in the first VMI, the first cloud-specific layer being associated with the first cloud, and the first cloud-specific layer permits operation of the first VMI on the first cloud; and
   obtain a second VMI for a second cloud different from the first cloud, wherein the second VMI is obtained based, at least in part, on the cloud agnostic image representation by unbundling the modified volume data to generate unbundled modified volume data and augmenting the unbundled modified volume data with cloud-specific settings for the second cloud, and the second VMI includes a second cloud-specific layer corresponding to the second cloud.

10. The apparatus of claim 9, wherein:
    to obtain the second VMI, the processor is configured to obtain the second cloud-specific layer comprising the cloud-specific settings for the second cloud; and
    augmenting the unbundled modified volume data includes augmenting the cloud agnostic image representation with the cloud-specific settings for the second cloud.

11. The apparatus of claim 9, wherein the processor is configured to:
    store the cloud agnostic image representation bundled in the modified volume data.

12. The apparatus of claim 11, wherein modifying the volume data associated with the first VM comprises:
    launching the first VM on the first cloud based, in part, on the first VMI;
    determining cloud-specific settings for the first VM comprised in the first cloud-specific layer; and
    modifying the volume data associated with the first VM by removing the cloud-specific settings for the first VM.

13. The apparatus of claim 9, wherein to obtain the second VMI, the processor is configured to:

launch a second VM on the second cloud based, in part, on the cloud agnostic image representation of the application; and obtain, in a format compatible with the second cloud, volume data for the second VM from the cloud agnostic image representation from a volume associated with the second VM.

14. The apparatus of claim 13, wherein the second VM runs a second operating system that is compatible with but different from a first operating system associated with the first VM.

15. The apparatus of claim 9, wherein the first cloud and the second cloud are selected from a plurality of available clouds, the first cloud is associated with a first cloud provider, and the second cloud is associated with a second cloud provider distinct from the first cloud provider.

16. The apparatus of claim 9, wherein the processor is further configured to deploy the second VMI on the second cloud.

17. A non-transitory computer-readable medium comprising executable instructions that cause a processor to:

obtain a cloud agnostic image representation of an application from a first Virtual Machine Image (VMI) associated with a first Virtual Machine (VM) on a first cloud, wherein the cloud agnostic image representation being obtained, in part, by modifying volume data associated with the first VM to remove a first cloud-specific layer in the first VMI, the first cloud-specific layer being associated with the first cloud, and the first cloud-specific layer permits operation of the first VMI on the first cloud; and obtain a second VMI for a second cloud different from the first cloud, wherein the second VMI is obtained based, at least in part, on the cloud agnostic image representation, la unbundling the modified volume data to generate unbundled modified volume data and augmenting the unbundled modified volume data with cloud-specific settings for the second cloud, and the second VMI includes a second cloud-specific layer corresponding to the second cloud.

18. The computer-readable medium of claim 17, wherein:
the instructions to obtain the second VMI cause the processor to obtain the second cloud-specific layer comprising the cloud-specific settings for the second cloud; and augmenting the unbundled modified volume data includes augmenting the cloud agnostic image representation with the cloud-specific settings for the second cloud.

19. The computer-readable medium of claim 17, wherein the instructions further cause the processor to:

store the cloud agnostic image representation bundled in the modified volume data.

20. The computer-readable medium of claim 17, wherein the instructions to obtain the second VMI cause the processor to:

launch a second VM on the second cloud based, in part, on the cloud agnostic image representation of the application; and obtain, in a format compatible with the second cloud, volume data for the second VM from the cloud agnostic image representation from a volume associated with the second VM.

* * * * *